Patented July 10, 1951

2,560,173

UNITED STATES PATENT OFFICE 2,560,173

CONDENSATION OF ALKYL ARYL ETHERS WITH ALPHA-HALOGEN ALKANALS

Carl E. Johnson, Hammond, and Chester E. Adams, Highland, Ind., assignors to Standard Oil Company, Chicago, Ill., a corporation of Indiana No Drawing. Application December 27, 1948, Serial No. 67,548

13 Claims. (Cl. 260—338)

This invention relates to a process for the chemical condensation of an aryl alkyl ether with an alkanal containing at least one halogen atom in the position alpha to the carbonyl group; more particularly, it relates to novel catalysts for said condensation reaction.

The chemical condensation of aryl alkyl ethers with alpha-chloro alkanals in the presence of concentrated sulfuric acid is well known, particularly the condensation of anisole with chloral or equivalent reagents such as chloral hydrate, chloral alcoholate or chloral acetal. The condensation of chloral with anisole is typical of the chemical condensation reactions which may be effected between aryl alkyl ethers and alpha-halogen alkanals. The chemical condensation reactions in question involve the formation of water by the reaction of one nuclear hydrogen atom in each of two molecules of the aryl alkyl ether by reaction with the oxygen atom of the alkanal, and the simultaneous production of a alpha-halogen substituted alkylidene bisalkoxyaryl compound, as illustrated by the following equation:

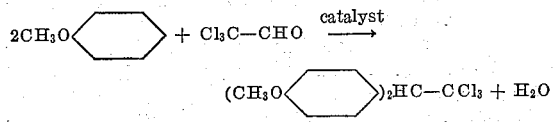

When concentrated sulfuric acid or oleum is employed to catalyze condensation reactions of the type discussed above, extensive sulfonation of the aryl alkyl ether occurs, the desired condensation product becomes contaminated with difficultly separable by-product and the spent sulfuric acid catalyst becomes too highly contaminated with acid-soluble sulfonic acids to be easily recoverable. We have found that chemical condensation reactions of the type described above can be effected smoothly to produce high yields of the desired condensation product without the disadvantages attendant upon the use of sulfuric acid catalyst, by contacting the reactants with a sulfonic acid.

The catalysts which we employ in the process of our invention are organic sulfonic acids, particularly the hydrocarbon sulfonic acids. By way of example, we may employ aromatic sulfonic acids. Examples of aromatic monocyclic sulfonic acids are mono- or polysulfonic acids derived from benzene, toluene, xylenes, cymene, tert-butylbenzene, chlorobenzene and the like, preferably the mono- and disulfonic acids derivable from benzene and toluene. We may also employ aromatic dicyclic sulfonic acids, such as the mono- or polysulfonic acids derivable from naphthalene, methylnaphthalenes, diphenyl and the like. Likewise, aralkyl sulfonic acids may be employed for the purpose of the present invention, for example beta-phenyl ethanesulfonic acid.

The preferred sulfonic acids for the practice of the present condensation process are the alkanesulfonic acids having one to five carbon atoms, inclusive, in the molecule, or mixtures thereof. We prefer to use these lower alkanesulfonic acids as catalysts because of their non-sulfonating, non-oxidizing and liquid properties. The latter property makes them especially valuable due to their ease in handling. Their failure to form solid hydrates with the water liberated in the reactions simplifies the operational procedures and equipment. These sulfonic acids can readily be prepared by the processes described in U. S. Letters Patent 2,433,395 and 2,433,396.

Suitable aryl alkyl ethers and aryl cycloalkyl ethers for use in our process comprise, by way of illustration, the methyl, ethyl, isopropyl, tert-butyl, tert-octyl, lauryl, n-hexadecyl, cyclopentyl, cyclohexyl, methylcyclopentyl and methylcyclohexyl ethers of phenol ($C_6H_5OH$), or other aryl hydroxy compounds, for example, nuclear substituted phenols, naphthols, hydoxy diphenyls, and the like. We may also employ alkyl or cycloalkyl ethers derived from di- or poly-hydroxy aryl compounds, for example, resorcinol, pyrogallol, catechol, dihydroxy naphthalenes, dihydroxy diphenyls and the like; specific examples are catechol diethyl ether and catechol methylene ether (1,3-benzodioxol).

Examples of suitable alpha-halogen alkanals for use in the present process are mono-, di- or tri-halogen acetaldehydes, e. g., chloral, tribromoacetaldehyde, monofluoroacetaldehyde, dichlorofluoroacetaldehyde, difluorochloroacetaldehyde, dibromochloroacetaldehyde and the like. Examples of other suitable alpha-halogen alkanals for use in our process comprise alpha-chloropropionaldehyde, alpha-dichlorobutyraldehyde, alpha-chlorononanal, alpha-iodononanal, alpha-dichloroheptanal, alpha-bromo-octanal and the like. It should be understood that in place of the alkanals we may employ alkanal derivatives which, under the reaction conditions, generate the free alkanal, for example, acetals, alcoholates or hydrates of the various alpha-halogen alkanals, as the case may be, but ordinarily we prefer to employ the alpha-halogen alkanals per se.

It will be apparent that in lieu of effecting interaction between one aryl alkyl ether and one alkanal, simultaneous reaction may be effected between one aryl alkyl ether and a mixture of alkanals, or between two or more aryl alkyl ethers and one or more alkanals, but it will be obvious that in such cases mixed reaction products and mixtures of reaction products will usually be produced. Thus a mixture of anisole and catechol methylene ether may be reacted with chloral to produce 1,1,1- trichloro- 2- (p-methoxyphenyl), 2-(3,4-dioxymethylenephenyl) ethane having the formula

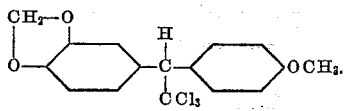

In carrying out the condensation process of this invention, any order of addition of the catalyst and reagents can be employed, although, in general, we prefer to avoid long contact between the alkanal and the sulfonic acid catalyst in the absence of the aryl alkyl ether. In any event, the two reactants are vigorously contacted with the sulfonic acid catalyst by mechanical agitation, passage through orifice mixers or the like, employing equipment of the type which has heretofore been employed for the alkylation of isoparaffinic or aromatic hydrocarbons with olefinic hydrocarbons in the presence of liquid acid catalysts.

The mol ratio of the aryl alkyl ether to the alkanal in the reaction zone may be varied between about 1 and about 6, and is preferably between about 2.0 and about 2.5. The mol ratio of sulfonic acid catalyst to the alkanal can be varied within wide limits depending upon the preferred type of operation. For example, operating under conditions in which the water liberated by the reaction is removed continuously, this ratio may be about 0.1 or even lower. However, if the water is not removed from the reaction mixture as formed, this ratio may be as high as about 12. Similarly, the reaction temperature may be varied depending upon the type of operation. For reasons of economy we would prefer to operate above about 10° to 15° C. to minimize refrigeration costs. Our process should not be operated at temperatures above about 120-125° C. since above these temperatures there is a tendency for the product to resinify and become discolored. Ordinarily, we prefer to operate at temperatures not substantially above 100° C. Ordinarily the condensation process of the present invention is effected at or about atmospheric pressure, but either sub- or super-atmospheric pressures may be employed when that is advantageous.

In some instances, it may be advantageous to remove the water formed in the course of the chemical condensation reaction at substantially the rate at which it is produced in the reaction zone. Water removal as vapor may be effected, when the boiling points of the reactants are sufficiently high, by maintaining the reaction zone at suitable temperatures and pressures and condensing the water vapor which passes overhead from the reaction zone into an external condenser, being thus removed from the reaction system. If desired, inert water-entraining or azeotropic materials may be supplied to the reaction zone to aid in the removal of water therefrom, for example, n-heptane, benzene, toluene, chloroform, ethyl acetate and the like. It is not ordinarily essential to the practice of the process of our invention to remove water from the reaction zone as formed. When water is not removed from the reaction zone as formed, the aqueous sulfonic acid can be recovered, dehydrated, and recycled to the reaction zone.

In order to illustrate but not necessarily to limit our invention, reference is made to the following example:

Chloral (75.5 grams) and anisole (235.2 grams) were mixed at room temperature (22° C.). To this well-stirred solution was added 410 ml. of ethanesulfonic acid. The temperature rose from 22° C. to a maximum of 57° C. in approximately one-half hour and the solution was stirred another hour. The mixture was allowed to set several days and then 90 ml. more of ethanesulfonic acid was added, but this addition caused no heat effects and it appears that the reaction had been completed by the original acid. The acid layer was separated from the viscous oily layer. The oil layer was washed, neutralized with ammonia, and then steamed to remove excess reactants. The resulting oil was viscous at 90° C. but solidified and yielded an amber-colored crystalline material which was the desired 1,1,1-trichloro-2,2-bis(paramethoxyphenyl) ethane, an insecticide commonly known as methoxychlor. The yield of product was 137 grams which corresponds to approximately 78% of the theoretical. The crude material had a setting point of 78° C. which corresponds favorably with 77+° C., which is the specification on technical methoxychlor currently available on the market.

We have observed that aryl alkyl ethers are far more reactive with alpha-halogen alkanals in the presence of sulfonic acid catalysts than chlorobenzene, and presumably, aromatic hydrocarbons. Thus, when a mixture of 0.1 mol of chloral, 0.2 mol of chlorobenzene and 1.48 mols of pure methanesulfonic acid was heated at 70° to 130° C. for six hours, no DDT (1,1,1-trichloro-2,2-bis(p-chlorophenyl)ethane) could be isolated from the reaction mixture and only a small quantity of black, viscous oil was obtained besides the original reactants.

Certain of the reaction products obtainable by the process of this invention have high pesticidal potency, for example, the ethoxy analog of DDT and the mixed methylenedioxy, methoxy analog of DDT which has been mentioned above. It will be apparent also that the reaction products of the process of this invention furnish interesting materials for further chemical syntheses, having as they do a number of functional groups available for further reaction, including nuclear hydrogen atoms, an ether grouping, an active hydrogen in the ethylidene group, active halogen atoms, etc.

In the appended claims, the term "alkyl" is intended to define both alkyl and cycloalkyl radicals.

Having thus described our invention what we claim is:

1. A process which comprises contacting an aryl alkyl ether with an alpha-halogen alkanal and a catalytic quantity of a hydrocarbon sulfonic acid at a temperature sufficient to effect a water-producing condensation reaction between two mols of said ether and one mol of said alkanal.

2. The process of claim 1 wherein said sulfonic acid is an alkanesulfonic acid having one to five carbon atoms, inclusive, in the molecule.

3. The process of claim 1 wherein said ether is an alkyl phenyl ether.

4. The process of claim 1 wherein said ether has an unsubstituted nuclear para position.

5. The process of claim 1 wherein the ether is phenetol.

6. The process of claim 1 wherein the ether is 1,3-benzodioxol.

7. A process which comprises contacting an alkyl phenyl ether with chloral and a catalytic quantity of a hydrocarbon sulfonic acid at a temperature sufficient to effect a water-producing condensation reaction between two mols of said ether and one mol of chloral.

8. The proces of claim 7 wherein the alkyl phenyl ether is anisole.

9. The process which comprises contacting anisole with chloral and a catalytic quantity of an alkanesulfonic acid having 1 to 5 carbon atoms, inclusive, in the molecule at a temperature sufficient to effect a water-producing condensation reaction between two mols of anisole and one mol of chloral.

10. The process of claim 9 wherein the temperature is between about 10° C. and about 125° C.

11. The process of claim 9 which includes the steps of adding an inert water-entraining material to the reaction mixture, and removing water from the reaction mixture during the course of the reaction as an azeotrope.

12. The process of claim 1 which includes the additional step of removing the water formed in the course of said condensation reaction from the reaction zone.

13. The process of claim 1 which includes the additional steps of adding an inert water-entraining material to the reaction mixture and removing water from the reaction mixture during the course of the reaction as an azeotrope.

CARL E. JOHNSON.
CHESTER E. ADAMS.

REFERENCES CITED

The following references are of record in the file of this patent:

UNITED STATES PATENTS

| Number | Name | Date |
|---|---|---|
| 2,455,643 | Bakalar | Dec. 7, 1948 |

OTHER REFERENCES

Harris, "Jour. Am. Chem. Soc.," vol. 48 (1926), pages 3144–3150.